United States Patent Office 3,801,665
Patented Apr. 2, 1974

3,801,665
MANUFACTURE OF UNBRANCHED
ALKYL BENZENES
Natale Bertolini and Benedetto Calcagno, Milan, and
Marcello Ghirga, Bresso, Italy, assignors to Società
Italiana Resine S.I.R. S.p.A., Milan, Italy
Filed Aug. 2, 1972, Ser. No. 277,199
Int. Cl. C07c 3/56
U.S. Cl. 260—671 B                                    5 Claims

ABSTRACT OF THE DISCLOSURE

In a process for alkylation of benzene, use is made of an activated catalytic complex obtained by blending the spent catalytic sludge discharged from the alkylation reactor with the products of a treatment of the high boiling fractions obtained in the alkylation with hydrogen chloride, benzene and aluminium trichloride.

Figure 1:
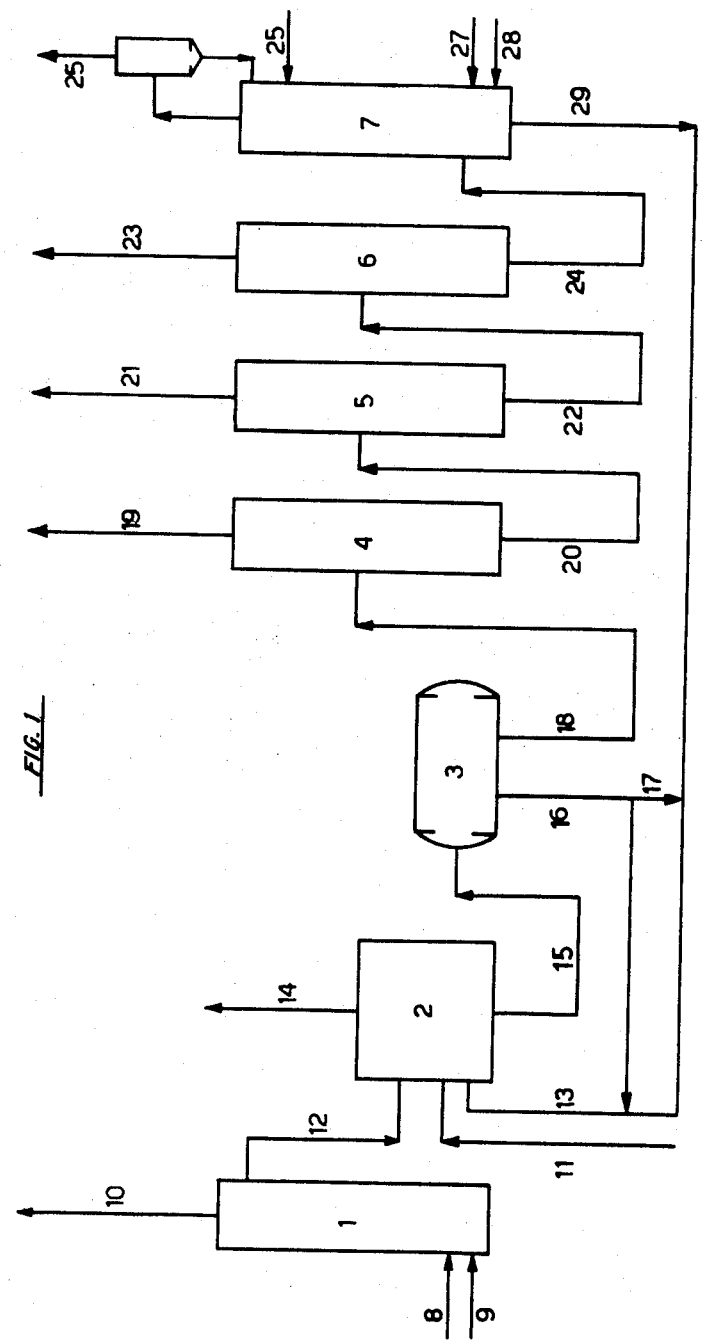

The present invention relates to improvements in processes for the manufacture of unbranched alkyl benzenes, more precisely the manufacture of alkyl benzenes in which the alkyl radical consists of an unbranched paraffin chain containing from 9 to 15 carbon atoms.

As is well known, such products are of great importance in the manufacture of biologically degradable detergents.

Alkyl benzenes having the alkyl substituent constituted by an unbranched paraffin chain are normally prepared, in industrial practice, by chlorination of unbranched paraffins, catalytic alkylation of benzene with the chlorinated paraffins obtained and fractionation of the alkylation product, after separation of the catalyst, into the components of the mixture.

Such processes do however have many drawbacks; in particular, they are characterized by not very high yields of useful product by reason of the by no means negligible formation of high boiling products. Furthermore, the unbranched alkyl benzenes obtained are not of high purity, due to the presence of substantial quantities of by-products, particularly chlorinated products; they are frequently of disagreeable odor and have other undesirable properties, particularly they are corrosive and toxic.

The causes of this phenomenon are not fully known. Probably, contributary factors are the phenomena of degradation and isomerization which occur in the alkylation stage.

In any case, whatever the causes, the processes described entail the drawback of producing unbranched alkyl benzenes with not very high yields, low purity and undesired characteristics. All this creates problems which it is difficult to resolve, particularly in connection with the characteristics of the products since, for the alkyl benzenes used in detergents, a virtually complete absence of chlorine and of disagreeable odors is required in the market.

One object of the present invention is a process for the manufacture of unbranched alkyl benzenes by alkylation of benzene with chlorinated paraffins, characterized by high yields of useful products.

Another object of the present invention is a process for the production of high purity unbranched alkyl benzenes.

Other objects will become manifest from the following description.

The said process is based mainly on chlorination of unbranched paraffins having from 9 to 15 carbon atoms per molecule, on alkylation, in the presence of an activated catalytic complex, of benzene, with the chlorinated paraffins obtained, and on fractionation of the alkylation product, after separation of the catalysts, into the components of the mixture.

The essential aspect of the present invention is, in the alkylation stage, the use of an activated catalytic complex obtained by blending the spent catalytic sludge discharged from alkylation reactors with the products of a particular treatment of the high boiling fractions obtained in alkylation.

More precisely, the said treatment consists essentially in bringing the high boiling by-products obtained in the alkylation into contact, preferably in a tubular reactor, with hydrogen chloride benzene and aluminum trichloride so that, at the head of the column, it is possible to separate off a fraction consisting of heavy hydrocarbon compounds, while a catalytic complex comprising aluminum trichloride is separated off at the base.

The catalytic complex thus obtained is subsequently blended with the spent catalytic sludge discharged from the alkylation reactor in order to give rise to activated catalytic complexes suitable for the purposes of the present invention.

More particularly, the high boiling by-products of alkylation, together with the aluminium trichloride, hydrogen chloride and benzene, are supplied to a tubular reactor which is maintained at a temperature of between 20 and 60° C. In such a reactor, the supply of media must be regulated so that the aluminium trichloride is present in quantities comprised between 2 and 4 and preferably 2.4 and 3 parts by weight per 10 to 25 parts by weight of high boiling fractions.

In addition, the molar ratio of hydrogen chloride to aluminium trichloride must be at a level equal to or greater than 1:1 and preferably equal to 1:1, while the molar ratio of benzene to aluminium trichloride must be equal to or greater than 1:1 and preferably between 2:1 and 5:1.

Under the conditions thus specified, the contact times are comprised in the range from 1 to 10 hours and preferably 2 to 4 hours.

The activated catalytic complex obtained after blending of the products of the above-described treatment with the catalytic sludge exhausted by alkylation, the quantities being regulated so that 25 to 125 parts by weight of the products of the treatment are blended with 100 parts by weight of sludge, is then supplied to the alkylation reactor, together with benzene and the mixture originating from the chlorination stage.

According to the present invention, the activated catalytic complex is preferably passed to the reactor in quantities of 0.25 o 0.35 parts by weight for every part by weight of chloroparaffin. Under these conditions, the benzene and the mixture containing chloroparaffin are supplied in quantities such as will produce a molar ratio of benzene to chloroparaffin of between 3:1 and 10:1.

In the preferred embodiment of the process of the present invention, alkylation is carried out in two reactors in series.

In this way, it is possible to avoid the presence of unaltered chloroparaffins at the outlet from the alkylation stage. By working as described above, the best results are obtained by performing alkylation at atmospheric pressure, with dwell times ranging from 1 to 3 hours and with the temperature comprised in the range from ambient values to the value corresponding to the boiling point of benzene.

The chloroparaffins used in alkylation are produced in a prior stage, by supplying to a chlorination reactor paraffins with a number of atoms per molecule comprised between 10 and 14, and chlorine preferably in such a quantity that the molar ratio of paraffin to chlorine is between 10:1 and 2:1 and is preferably between 5:1 and 3:1.

The spatial velocities, understood as volumes of paraffins supplied per volumes of reactor and per hour, are preferably comprised between 0.4 and 0.7.

Under these conditions, working at ambient pressure or a slightly higher pressure, the temperature should be comprised between 50 and 170° C. and preferably between 80 and 120° C.

The mixtures obtained in the chlorinated stage, consisting essentially of chloroparaffins and unaltered paraffins, are passed directly to alkylation. The invention will now be illustrated in greater detail by means of the diagram in the attached FIG. 1. The reactors for chlorination, alkylation and treatment of the high boiling fractions are represented respectively by 1, 2 and 7.

For the above-described treatment of the high boiling fractions, the high boiling by-products obtained by alkylation are fed to 7 through 24, while the aluminium trichloride, hydrogen chloride and benzene are supplied respectively through 26, 27 and 28.

Under the aforesaid conditions, one fraction is separated off through 25 and is composed of hydrocarbon compounds, while the catalytic complex comprising aluminium trichloride is separated through 29.

The catalytic complex thus obtained is subsequently blended with the spent catalytic sludge discharged from the alkylation reactor by means of 16, giving rise to the activated catalytic complex which is supplied through 13 to the alkylation reactor 2. Through 11 and 12, the said reactor is furthermore supplied with benzene and the mixtures containing chlorinated paraffins respectively.

These latter are produced in the chlorination reactor 1, 8 and 9 being used for the supply of paraffins and chlorine respectively while 10 is used for the discharge of hydrogen chloride.

The hydrogen chloride which is produced during alkylation is discharged through 14 while the mixture obtained in alkylation is passed through 15 into the decanter 3. In this latter, the mixture originating from alkylation is separated from the spent catalytic sludge, part of which is discharged finally through 17 while the remainder is passed through 16 to be blended with the product coming from 7 through 29.

The alkylation mixture, freed of the catalytic sludge, is pased through 18 into 4, where the benzene is separated by distillation at atmospheric pressure.

Benzene emerges through 19, and the remaining mixture is transferred through 20 into 5 where the unmodified paraffins are separated by distillation at reduced pressure, preferably at a pressure between 150 and 200 mm. Hg.

Paraffins emerge through 21, and the remainder of the mixture is transferred through 22 into 6, where the unbranched alkyl benzenes are separated by distillation at low pressure, preferably between 20 and 50 mm. Hg, through 23.

The high boiling by-products of alkylation are finally transferred through 24 into the reactor 7 where they are subjected to the above-described treatment. With respect to the known techniques in which, in the production of unbranched alkyl benzenes by alkylation of benzene with chloroparaffins in the alkylation reactor, aluminium trichloride is supplied as such, or a mixture obtained by blending aluminium trichloride as such with spent sludge, working under the same conditions and using the process of the present invention, with an increase averaging 3 to 6% in terms of yield of unbranched alkyl benzenes. Furthermore, the resultant unbranched alkyl benzenes are characterized by the absence of disagreeable odors and by being of high purity, particularly by a chlorine content of less than 100 p.p.m.

The invention will now be illustrated by the following examples which are not intended however to constitute any limitation of the invention. Example 1 is for purposes of comparison.

EXAMPLE 1

345 kg./hr. approximately of gaseous chlorine and 2400 kg./hr. of unbranched $C_{10}$–$C_{14}$ paraffins, consisting of approximately 69% by weight of recycled paraffins, the remaining approximately 31% consisting of fresh paraffins with a titre of approximately 99% n-paraffins, are fed into a tubular reactor.

The composition of the n-paraffins as a percentage by weight, determined by gas chromatographic analysis, was as follows:

| | Percent |
|---|---|
| $C_{10}$ | 14.9 |
| $C_{11}$ | 36.4 |
| $C_{12}$ | 28.6 |
| $C_{13}$ | 14.8 |
| $C_{14}$ | 5.3 |

The temperature in the reactor was maintained at approximately 110° C.

The products of chlorination freed of hydrogen chloride by a degassing stage were then supplied to the alkylation stage, together with 2400 kg./hr. of benzene and 275 kg./hr. of catalytic sludge. The latter consisted of the spent products discharged from the reactor and enriched with aluminium trichloride in quantities equal to approximately 9% of the sludge. In this phase, two agitated reactors are used, positioned in series inter se, so as to avoid the presence of unmodified chloroparaffins at the outlet from the alkylation stage. The reaction temperature was equal to 70° C. and the volume of the two reactors allowed a total alkylation dwell time of approximately one hour. The products discharged from alkylation were then decanted in order to separate the catalytic sludge, washed with a 5% soda solution and then neutralized by washing with water.

The alkylation mixture, cleansed of the catalytic sludge, was then separated from the benzene by distillation at atmospheric pressure and then the unmodified paraffins were eliminated by distillation at a pressure of 200 mm. Hg.

In this way, approximately 2030 kg./hr. of benzene and 1645 kg./hr. approximately of unmodified paraffins were obtained. The remaining mixture was transferred to a distillation column maintained at a pressure of 40 mm. Hg, from the head of which approximately 945 kg./hr. of unbranched alkyl benzenes were recovered, while approximately 160 kg./hr. of high boiling products were obtained at the base. By proceeding under these conditions, after approximately three months' operation, the alkyl benzenes had a chlorine content in excess of 700 p.p.m.

Furthermore, the alkyl benzenes thus produced had a pungent smell of paraffin.

EXAMPLE 2

Initially, chlorination was carried out as described in Example 1, the same quantities of reagents being used. The products of chlorination, freed of hydrogen chloride by a degassing process, were supplied to the alkylation stage together with 2400 kg./hr. of benzene and 345 kg./hr. of the activated catalytic complex.

This last-mentioned had been obtained by blending 250 kg./hr. approximately of spent catalytic sludge discharged from the alkylation reactor with approximately 95 kg./hr. of the products of the treatment previously described.

In this phase, two agitated reactors were used, positioned in series inter se so as to avoid the presence of unmodified chloroparaffins at the outlet from the alkylation stage.

The temperature of reaction, at atmospheric pressure, was equal to 70° C., while the alkylation dwell time was regulated to approximately one hour. The products discharged from alkylation were then decanted in order to separate the catalytic sludge, washed with a 5% soda solution and then with water to neutrality.

The alkylation mixture, freed of the catalytic sludge, was then separated from the benzene by distillation at atmospheric pressure, followed by elimination of the unmodified paraffins by distillation at a pressure of 200 mm. Hg.

In this way, approximately 2050 kg./hr. of benzene and approximately 1650 kg./hr. of unmodified paraffins were recovered. The remaining mixture was transferred to a distillation column maintained at a pressure of 40 mm. Hg, from the top of which approximately 995 kg./hr. of unbranched alkyl benzenes were recovered, while approximately 155 kg./hr. of high boiling products were recovered at the base.

These high boiling products were transferred to a tubular reactor maintained at 40° C., to which were also supplied 24 kg./hr. of aluminium trichloride, 70 kg./hr. of hydrogen chloride and 30 kg./hr. of benzene.

Operations were carried out in such a way that dwell time in the reactor was equal to three hours.

By working under these conditions, approximately 115 kg./hr. of a fraction consisting of heavy hydrocarbon compounds were collected at the top of the column, while approximately 95 kg./hr. of the catalytic complex comprising aluminium trichloride were collected at the bottom.

This complex was subsequently blended with approximately 250 kg./hr. of spent catalytic sludge discharged from the alkylation reactor and the activated catalytic complex obtained was supplied to the alkylation reactor.

The alkyl benzenes thus produced were characterized by the absence of disagreeable odors and by the high purity achieved. By proceeding under the above-indicated conditions, after approximately three months' operation, the yields of unbranched alkyl benzenes were substantially unaltered and their chlorine content was equal to approximately 80 p.p.m.

What we claim is:

1. In a process for the manufacture of alkyl benzenes with an unbranched paraffin chain containing from 9 to 15 carbon atoms, by partial chlorination of unbranched paraffins having from 9 to 15 carbon atoms per molecule; catalytic alkylation, by means of the chlorinated paraffins, of benzene in excess; and fractionation of the alkylation product, after separation of the catalyst, into the components of the mixture; the improvement comprising carrying out the alkylation in the presence of an activated catalytic complex obtained by blending spent catalytic sludge discharged from the alkylation reactor with the products of a particular treatment of the high boiling fractions obtained in the alkylation, the quantities being regulated in such a way that 25 to 125 parts by weight of the products of the said treatment are blended with 100 parts by weight of the sludge, the treatment consisting essentially in suppling to a reactor maintained at a temperature comprised between 20 and 60° C. with contact times comprised between 1 and 10 hours, the high boiling by-products of alkylation, together with aluminium trichloride, hydrogen chloride and benzene, the rates of supply being so regulated that aluminium trichloride is present in quantities comprised between 2 and 4 parts by weight per 10 to 25 parts by weight of high boiling fractions, while the molar ratios of hydrogen chloride to aluminium trichloride and of benzene to aluminium trichloride are equal to or greater than 1:1.

2. Process as in claim 1, characterized in that, in the treatment of the high boiling fractions, the rates of supply are so regulated that the aluminium trichloride is present in quantities comprised between 2.5 and 3 parts by weight per 10 to 25 parts by weight of high boiling fractions, while the molar ratio of hydrogen chloride to aluminium trichloride is 1:1 and the molar ratio of benzene to aluminium trichloride is 2:1 to 5:1, the contact times being 2 to 4 hours.

3. Process according to claim 1, characterized in that alkylation is carried out by supplying the activated catalytic complex to the alkylation reactor in quantities of 0.25 to 0.35 part by weight for every part by weight of chloroparaffin.

4. Process according to claim 1, characterized in that the benzene and the mixture containing chloroparaffins are supplied to the alkylation reactor in quantities such as will produce a molar ratio of benzene to chloroparaffins which is comprised in the range from 3:1 to 10:1.

5. Process according to claim 1, characterized in that alkylation is carried out in two reactors in series, at atmospheric pressure, with dwell times comprised in the range between 1 and 3 hours and with a temperature comprised in the range from ambient levels to the level corresponding to the boiling point of benzene.

References Cited
UNITED STATES PATENTS

| | | | |
|---|---|---|---|
| 3,657,148 | 4/1972 | Becker et al. | 260—671 B |
| 3,683,043 | 8/1972 | Chirga et al. | 260—671 B |

CURTIS R. DAVIS, Primary Examiner

U.S. Cl. X.R.

260—671 C

UNITED STATES PATENT OFFICE
CERTIFICATE OF CORRECTION

Patent No. 3,801,665　　　　　　　Dated　　April 2, 1974

Inventor(s)　Natale Bertolini et al

It is certified that error appears in the above-identified patent and that said Letters Patent are hereby corrected as shown below:

In The Heading:

The claimed Priority Data was omitted. Should be:

--November 17, 1971　　　Italy............31196-A/71--

Signed and sealed this 17th day of September 1974.

(SEAL)
Attest:

McCOY M. GIBSON JR.　　　　　　　C. MARSHALL DANN
Attesting Officer　　　　　　　　Commissioner of Patents